(12) United States Patent
Antchak et al.

(10) Patent No.: US 9,347,498 B2
(45) Date of Patent: May 24, 2016

(54) CLUTCHED DEVICE WITH THRUST RING

(75) Inventors: John R. Antchak, Aurora (CA); James W. Dell, Newmarket (CA); Warren J. Williams, Oakville (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 168 days.

(21) Appl. No.: 13/979,812

(22) PCT Filed: Jan. 12, 2012

(86) PCT No.: PCT/CA2012/000032
§ 371 (c)(1),
(2), (4) Date: Aug. 13, 2013

(87) PCT Pub. No.: WO2012/094745
PCT Pub. Date: Jul. 19, 2012

(65) Prior Publication Data
US 2013/0319814 A1 Dec. 5, 2013

Related U.S. Application Data

(60) Provisional application No. 61/432,907, filed on Jan. 14, 2011.

(51) Int. Cl.
| F16D 13/08 | (2006.01) |
| F16D 41/20 | (2006.01) |
| F16D 7/02  | (2006.01) |
| B60K 17/02 | (2006.01) |
| B60K 25/02 | (2006.01) |

(52) U.S. Cl.
CPC ............... *F16D 13/08* (2013.01); *F16D 7/022* (2013.01); *F16D 41/206* (2013.01); *B60K 17/02* (2013.01); *B60K 2025/022* (2013.01)

(58) Field of Classification Search
CPC ........ F16D 13/08; F16D 7/022; F16D 41/206
USPC .......................................... 192/55.3, 75, 81 C
See application file for complete search history.

(56) References Cited

U.S. PATENT DOCUMENTS 2,459,972 A * 1/1949 Starkey ........................ 192/56.2
2,510,667 A   6/1950 Starkey
(Continued)

FOREIGN PATENT DOCUMENTS

CN       1890479 A     1/2007
DE   102007047394 A1   4/2008
(Continued)

OTHER PUBLICATIONS

PCT/CA2012/000032, International Search Report, Apr. 30, 2012.
(Continued)

*Primary Examiner* — Jacob S Scott
*Assistant Examiner* — Tinh Dang
(74) *Attorney, Agent, or Firm* — Millman IP Inc.

(57) ABSTRACT

A clutched device that includes a driving member, a driven member and a clutch assembly that is disposed between the driving and driven members. The clutch assembly includes a carrier, a wrap spring and a spacer. The carrier is configured to coupled the wrap spring to one of the driving and driven members to permit the transmission of rotary power there between. The spacer is configured to limit elongation of the wrap spring in an axial direction.

19 Claims, 7 Drawing Sheets

(56) References Cited

U.S. PATENT DOCUMENTS

| | | | |
|---|---|---|---|
| 2,533,973 A | 12/1950 | Starkey | |
| 4,674,612 A * | 6/1987 | Ogura | 192/48.92 |
| 6,691,846 B2 * | 2/2004 | Titus et al. | 192/41 S |
| 7,618,337 B2 | 11/2009 | Jansen et al. | |
| 7,624,852 B2 * | 12/2009 | Mevissen et al. | 192/41 S |
| 2005/0250607 A1 * | 11/2005 | Jansen et al. | 474/74 |
| 2009/0176583 A1 * | 7/2009 | Dell et al. | 464/40 |

FOREIGN PATENT DOCUMENTS

| | | |
|---|---|---|
| JP | 2004084744 A | 3/2004 |
| JP | 2004132436 A | 4/2004 |
| WO | 2005057037 A1 | 6/2005 |
| WO | 2010048732 A1 | 5/2010 |
| WO | 2010099605 A1 | 9/2010 |
| WO | 2010130058 A1 | 11/2010 |

OTHER PUBLICATIONS

International Preliminary Report on Patentability for PCT/CA2012/000032, Jul. 25, 2013, ISA.

Written Opinion for PCT/CA2012/000032, Apr. 30, 2012 ISA.

English Translation of the 1st Office Action and Search Report for CN Patent Application No. 201280013657.0.

* cited by examiner

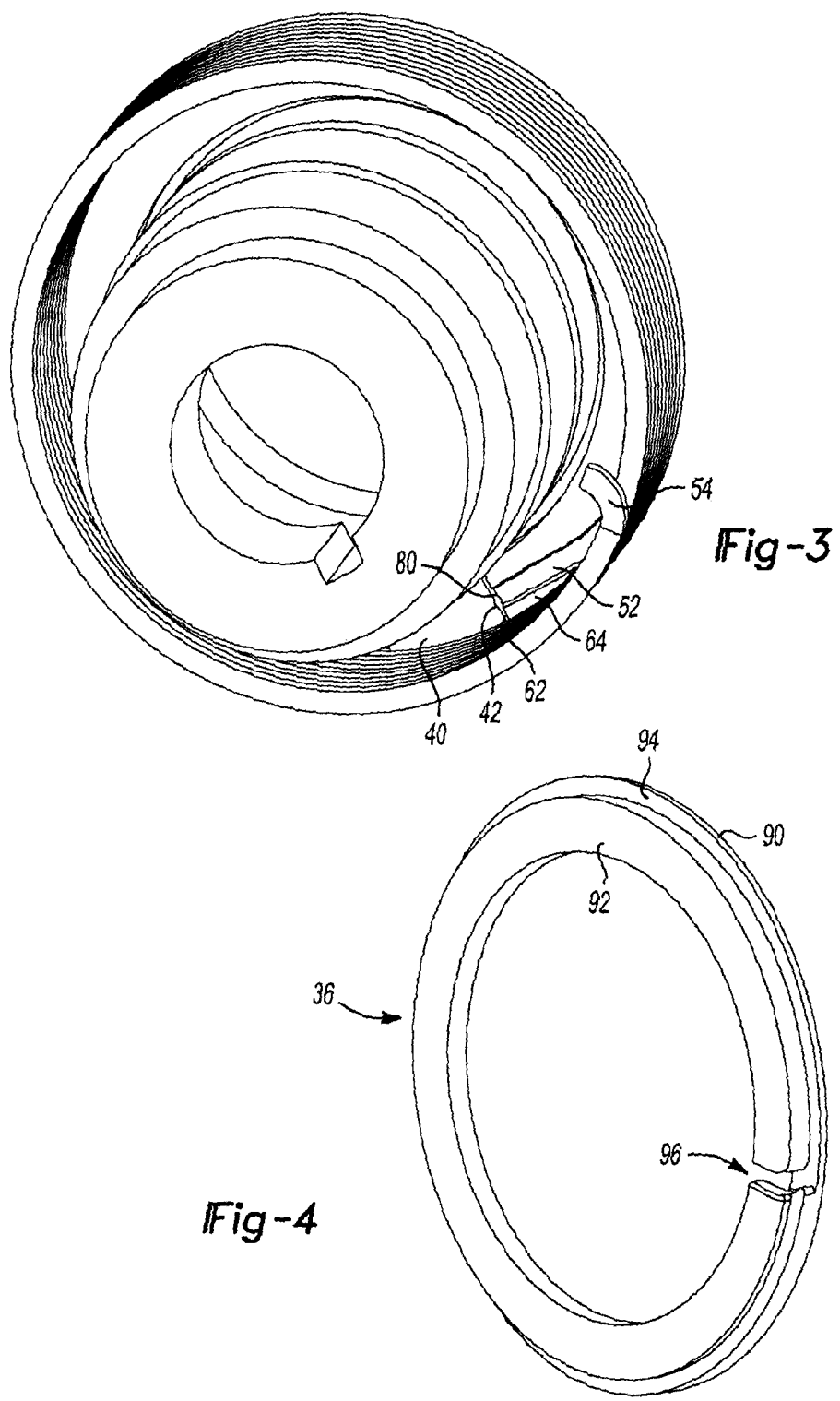

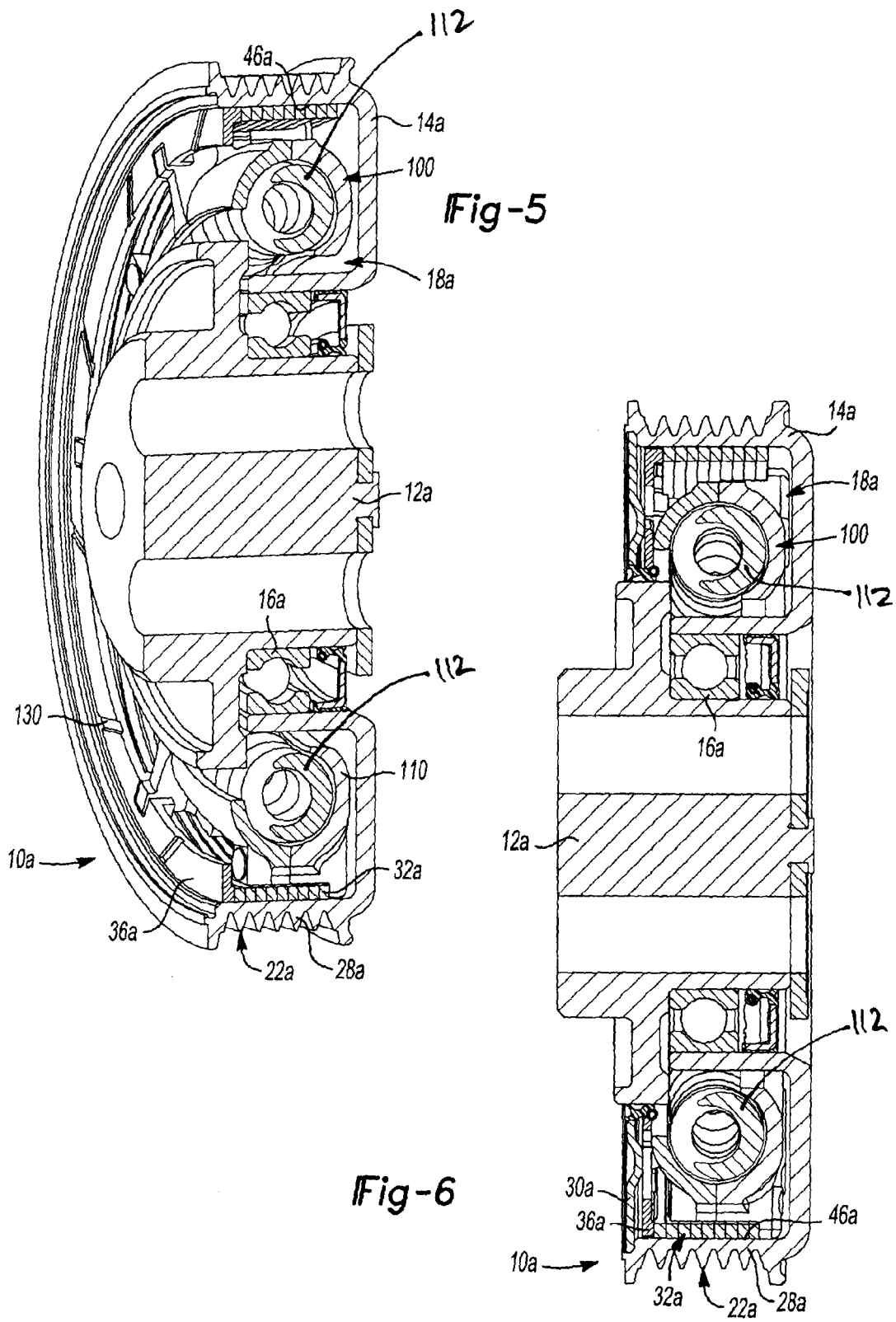

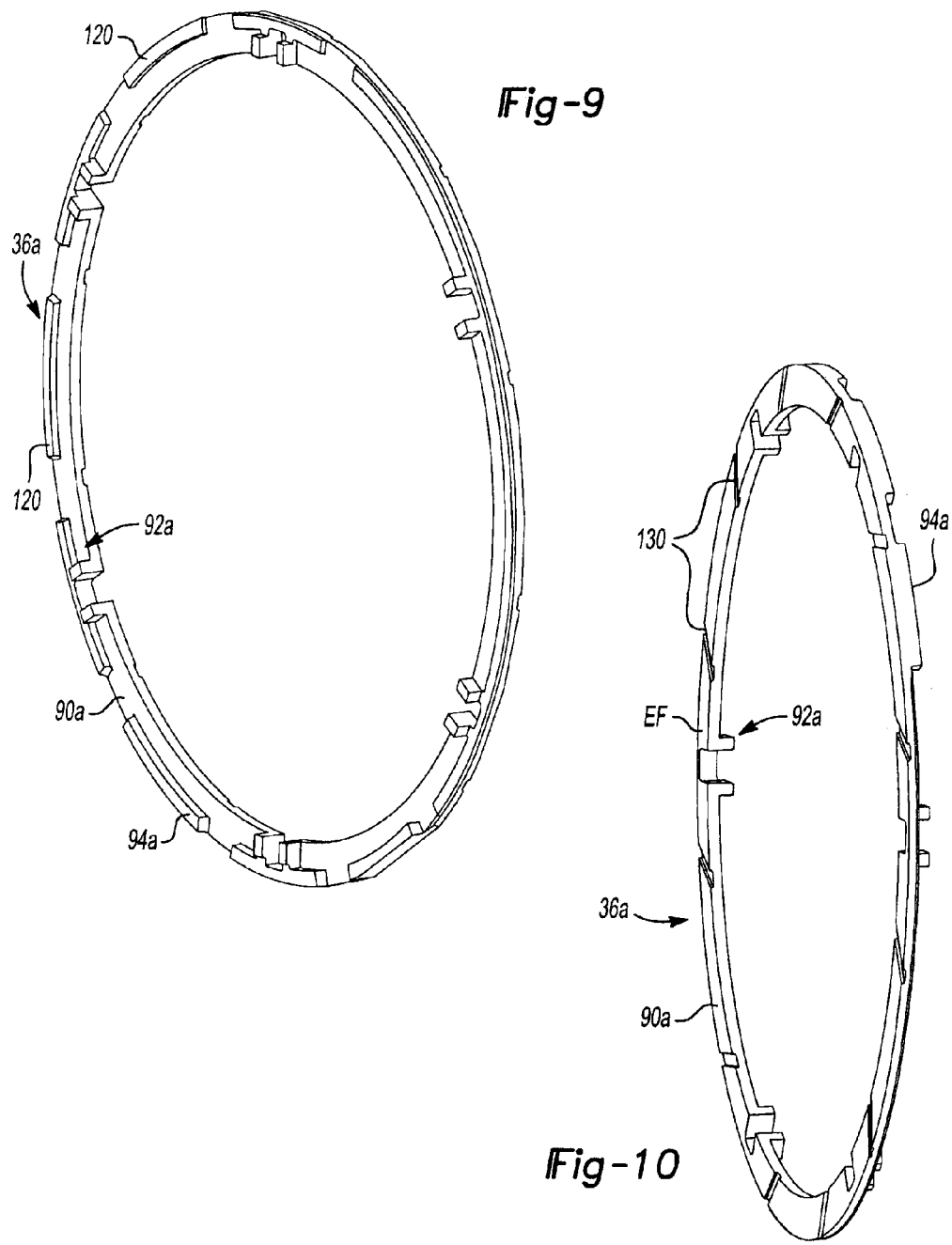

CLUTCHED DEVICE WITH THRUST RING

CROSS REFERENCE TO RELATED APPLICATIONS

This application is a national phase entry application of PCT/CA2012/000032, filed Jan. 12, 2012, which claims the benefit of U.S. Provisional Patent Application No. 61/423,907 filed Jan. 14, 2010 and entitled "Decoupler Device With Thrust Ring". The entire disclosure of U.S. Provisional Patent Application No. 61/423,907 is incorporated by reference as if fully set forth in detail herein.

FIELD

The present disclosure generally relates to clutched devices and more particularly, devices that comprise a wrap spring clutch.

BACKGROUND

Wrap spring clutches have been employed in various devices including decouplers, crankshaft decouplers, and engine starters. In our testing, we have become aware of a failure mode in a wrap spring clutch in which the wire that forms the wrap spring buckles in response to the transmission of relatively high rotary loads that had heretofore not been transmitted in such devices. Accordingly, there remains a need in the art for an improve wrap spring clutch that can be better suited for use when transmitting exceptionally high rotary loads.

SUMMARY

This section provides a general summary of the disclosure, and is not a comprehensive disclosure of its full scope or all of its features.

In one form, the present teachings provide a clutched device that includes a driving member, a driven member and a clutch assembly that is disposed between the driving and driven members. The clutch assembly includes a carrier, a wrap spring and a spacer. The carrier is configured to couple the wrap spring to one of the driving and driven members to permit the transmission of rotary power there between. The spacer is configured to limit elongation of the wrap spring in an axial direction.

In another form, the present teachings provide a clutched device that includes a driving member, a thrust ring, a driven member and a clutch assembly. The driving member has a shoulder. The thrust ring is coupled to the driving member. The clutch assembly is disposed between the driving member and the driven member. The clutch assembly includes a lug, a clutch surface, a carrier, a wrap spring, and a spacer. The lug is coupled to the driving member for rotation therewith. The clutch surface is rotatably coupled to the driven member. The carrier is mounted on the hub and abuts the shoulder. The wrap spring has a first end, a second end, and a plurality of helical coils between the first and second ends. The first end is coupled to the carrier and configured to cooperate with the carrier such that rotary power is output from the driving member and input to the wrap spring through at least one of the carrier and an axial end face of a wire that forms the first portion of the wrap spring. The spacer is disposed axially between the thrust ring and the wrap spring. The spacer is coupled to the second end of the wrap spring for rotation therewith.

In still another form, the present teachings provide a clutched device that includes a driving member, a driven member, a torsionally resilient member, and a clutch assembly. The torsionally resilient member receives rotary power from the driving member. The clutch assembly is disposed between the torsionally resilient member and the driven member and includes a carrier, a wrap spring, and a spacer. The carrier is configured to couple the wrap spring to the driven member to permit transmission of rotary power from the wrap spring to the driven member. The spacer is coupled to the carrier for rotation therewith and is configured to limit elongation of the wrap spring in an axial direction away from the carrier.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a rear perspective view of the portion of the clutched device shown in FIG. 2;

FIG. 4 is a front perspective view of a portion of the clutched device of FIG. 1 illustrating a spacer that is associated with the clutch assembly;

FIG. 5 is a longitudinally sectioned perspective view of a portion of a second clutched device constructed in accordance with the teachings of the present disclosure;

FIG. 6 is a longitudinal section view of clutched device of FIG. 5;

FIGS. 9 and 10 are front and rear perspective views, respectively, of a portion of the clutched device of FIG. 5 illustrating a spacer associated with the clutch assembly;

Corresponding reference numerals indicate corresponding parts throughout the several views of the drawings.

DETAILED DESCRIPTION

Example embodiments will now be described more fully with reference to the accompanying drawings.

Figure 1:
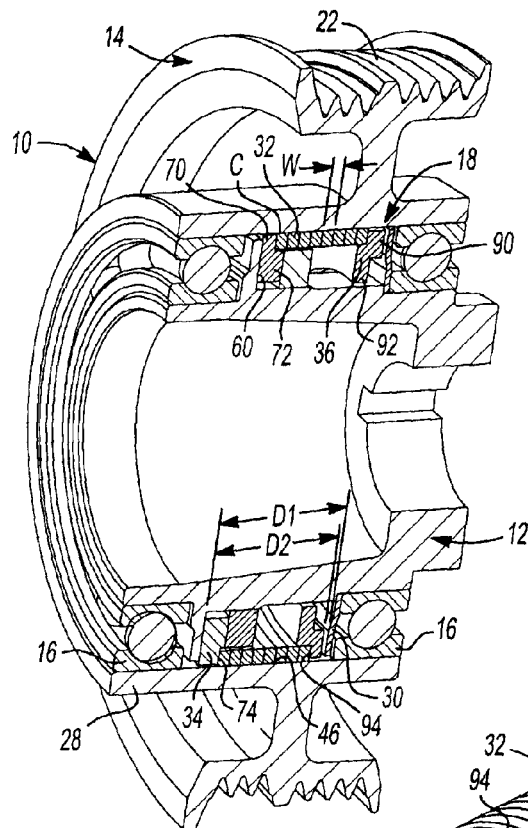
FIG. 1 is a longitudinal section view of a clutched device constructed in accordance with the teachings of the present disclosure.

With reference to FIG. 1 of the drawings, a device incorporating a wrap spring clutch constructed in accordance with the teachings of the present disclosure is generally indicated by reference numeral 10. In the particular example provided, the clutched device 10 is a clutch that is disposed in series between two rotary components (i.e., a driving member 12 and a driven component 14), but it will be appreciated that the clutched device could be any type of clutched device and could be configured to provide additional functionality. For example, the clutched device could be a crankshaft decoupler that can be similar to that which is disclosed in U.S. Pat. No. 7,624,852 or International Patent Application No. PCT/CA2010000296 or U.S. Provisional Patent Application No. 61/358,540; a decoupler that can be similar to that which is disclosed in U.S. Pat. No. 7,618,337, International Patent Application No. PCT/CA2009/001803 or U.S. Provisional Patent Application No. 61/431,006; or an engine starter of the type that is disclosed in International Patent Application No. PCT/CA2010/000760. The disclosure of each of the aforementioned patents and applications is hereby incorporated by reference as if fully set forth in detail herein.

In the particular example provided the clutched device 10 is a clutched pulley, the driving member 12 is a hub, the driven member 14 is a sheave, and the driven clutched device 10 further comprises a pair of bearings 16 and a clutch assembly 18.

Figure 2:
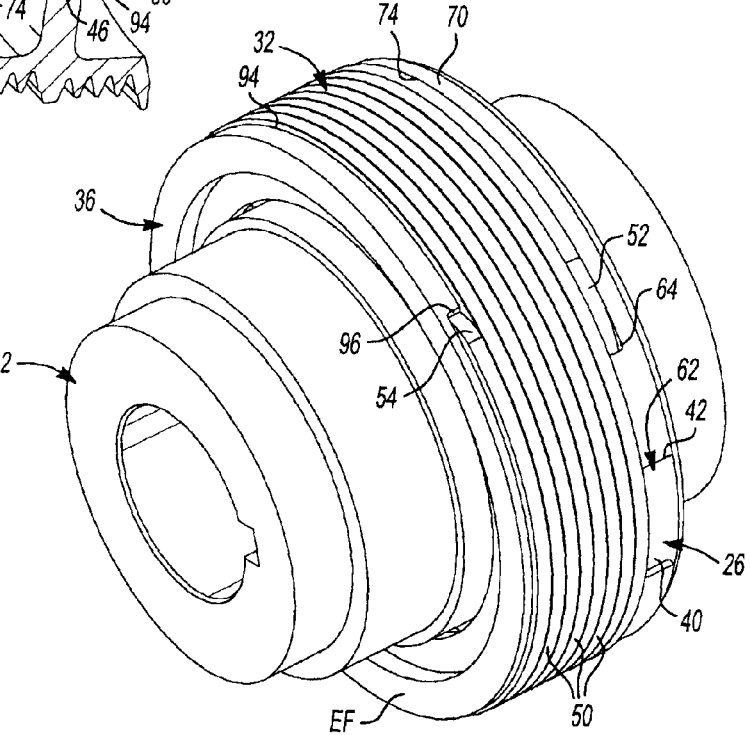
FIG. 2 is a perspective view of a portion of the clutched device of FIG. 1 illustrating portions of a driving member and a clutch assembly.

With additional reference to FIG. 2, the driving member 12 can be configured to be non-rotatably coupled to a shaft (not shown). The driven member 14 can comprise an output portion 22 that can be configured to transmit a rotary output. While the output portion 22 depicted herein is configured to engage two distinct poly-V belts, it will be appreciated that the output portion 22 could be configured to engage more or fewer belts, or could be configured to transmit rotary power through a chain drive or a gear drive (in which case the output portion 22 would include sprocket teeth or gear teeth, respectively). The bearings 16 can be disposed between the driving member 12 and the driven member 14 such that the two are mounted coaxially about a common rotational axis.

The clutch assembly 18 can include a clutch input member 26, a clutch output member 28, a thrust plate 30, a wrap spring 32, a carrier 34 and a thrust ring 36.

The clutch input member 26 can be integrally formed with the driving member 12 and can comprise a radial lug 40 that can define an abutment surface 42. The clutch output member 28 can be integrally formed with the driven member 14 and can include a clutch surface 46. The thrust plate 30 can be axially fixed to the driving member 12 between the thrust ring 36 and one of the bearings 16 and can inhibit contact between the thrust ring 36 and the bearing 16.

The wrap spring 32 can be formed of a suitable wire material and can comprise a plurality of helical coils 50, a first end 52 and a second end 54. The helical coils 50 can be received within the clutch input member 26 and frictionally engaged (e.g., via a press fit) to the clutch surface 46. If desired, a portion of the wrap spring 32, such as a portion that includes the second end 54, can be sized somewhat smaller in diameter than the remainder of the helical coils 50 to permit this portion of the wrap spring 32 to radially expand and contract with less resistance. For example, a 30 degree to 180 degree section of the wire that forms the wrap spring 32 and includes the second end 54 can be formed to a diameter that provides a desired fit (such as a line-to-line fit). The first and second ends 52 and 54 can extend from opposite axial ends of the helical coils 50 and will be discussed in more detail below.

With reference to FIGS. 1 through 3, the carrier 34 can be a generally annular structure that can include a carrier body 60 with a lug recess 62 and a groove 64. The carrier body 60 can include a first portion 70, which can be somewhat smaller in diameter than the clutch surface 46, and a second portion 72 that can be received within the helical coils 50 of the wrap spring 32. The side of the first portion 72 that faces the wrap spring 32 can include a helical ramp 74 that can match (and thereby directly abut) the wire that forms the wrap spring 32. The lug recess 62 can be configured to receive the radial lug 40 of the clutch output member 28 such that the carrier 34 is coupled to the clutch output member 28 for rotation therewith. The groove 64 can be configured to matingly receive the first end 52 of the wrap spring 32, as well as to orient the first end 52 of the wrap spring 32 such that an end face 80 of the first end 52, which is generally perpendicular to the longitudinal axis of the wire that forms the wrap spring 32, is abutted directly against the abutment surface 42 on the radial lug 40.

With reference to FIGS. 1, 2 and 4, the thrust ring 36 can comprise a first spacer portion 90 and a second spacer portion 92. The first spacer portion 90 can be somewhat smaller in diameter than the clutch surface 46 and can abut the wrap spring 32 on a side opposite the first portion 70 of the carrier body 60. The side of the first spacer portion 70 that abuts the wrap spring 32 can include a helical spacer ramp 94 that can match (and thereby directly abut) the wire that forms the wrap spring 32. If desired, the thrust ring 36 can include a feature that can receive the second end 54 of the wrap spring 32. In the particular example provided, the second end 54 is bent or hooked radially inwardly from the helical coils 50 at an approximately right angle (best shown in FIG. 3); the second end 54 is received into a mating groove 96 that is formed in the thrust ring 36 to inhibit rotation of the spacer relative to the second end 54 of the wrap spring 32.

With reference to FIGS. 1 through 4, the rotation of the driving member 12 will cause corresponding rotation of the radial lug 40. As the first end 52 of the wrap spring 32 is abutted against the abutment surface 42 of the radial lug 40, energy is transmitted through the radial lug 40 (including the abutment surface 42) into the wrap spring 32 (directly, through the end face 80 of the first end 52 and/or indirectly, from the carrier 34, which is non-rotatably mounted to the radial lug 40, through the first end 52 of the wrap spring 32 that is engaged in the groove 64 in the carrier 34). Rotary power input to the wrap spring 32 in this manner can cause the helical coils 50 to expand somewhat in a radially outwardly direction and further engage the clutch surface 46 to thereby transmit rotary power from the wrap spring 32 to the driven member 14.

The thrust ring 36 is sized in an axial direction to limit axial expansion of the wrap spring 32 along the rotational axis of the clutched device 10 (i.e., toward the thrust plate 30), as well as to provide damping of the second end 54 of the wrap spring 32. More specifically, the thrust ring 36 is sized so that the wrap spring 32 will not elongate along the rotational axis to an extent where the clearance between any adjacent pair of the helical coils 50 would be sufficiently large so as to permit buckling and/or bending of any individual one of the helical coils 50. Those of skill in the art will appreciate that the amount of axial elongation in the wrap spring 32 that is permissible depends on several factors, including the magnitude of the load transmitted through the clutched device 10, the cross-sectional shape and dimensions of the wire that forms the wrap spring 32 and the degree to which the wire that forms the helical coils 50 can tip or rotate about the longitudinal axis of the wire such that portions of the helical coils 50 would contact the clutch surface 46 on a corner C of the generally rectangular cross-sectional shape of the wire. As one general example, the thrust ring 36 can be configured to limit the amount of internal clearance between the driving member 12 and the thrust plate 30 (i.e., D1-D2 in the example provided, where D1 is the linear dimension between the a surface of the driving member 12 and a surface of the thrust plate 30, and D2 is the axial length of the carrier body 60, the wrap spring 32 and the spacer 36) to a dimension that is less than the width W of wire that forms the wrap spring 32 (i.e., D1−D2<W), such as a dimension between 0.1 to 0.75 times the width of the wire that forms the wrap spring 32.

It will be appreciated that axial elongation of the wrap spring 32 can drive the thrust ring 36 into contact with the thrust plate 30 and that such contact can provide normal or axial damping of the wrap spring 32. Because the end face EF of the thrust ring 36 is flat and because the helical spacer ramp 94 conforms to the axial end of the wrap spring 32, contact between the thrust ring 36 and the thrust plate 30 can be uniform about their circumference, which provides more consistent damping (as compared to a similar device that lacks the thrust ring 36) and lowers wear and stresses exerted on the thrust plate 30 by avoiding point loading that would occur if the thrust plate 30 were directly contacted by the wrap spring 32. It will be further appreciated that sliding engagement of the second end 54 of the wrap spring 32 on the second portion 92 and/or against the helical spacer ramp 94 (e.g., in response to changes in the magnitude of the rotary load that is transmitted through the wrap spring 32) can provide radial damping of the wrap spring 32.

It will be appreciated that the helical spacer ramp 94 can be configured to uniformly support the axial end of the wrap spring 32 about its entire circumference. It will be understood, however, that the helical spacer ramp 94 need not be continuous over its circumferential length, but rather could be configured in a circumferentially intermittent manner such that the associated axial end of the wrap spring 32 is supported at a plurality of discrete locations. It will be further appreciated that the helix angle of the wire that forms the helical coils 50 of the wrap spring 32 can be achieved through the relatively uniform support of the axial end of the wrap spring 32 and control of the axial expansion of the wrap spring 32.

Figure 7:
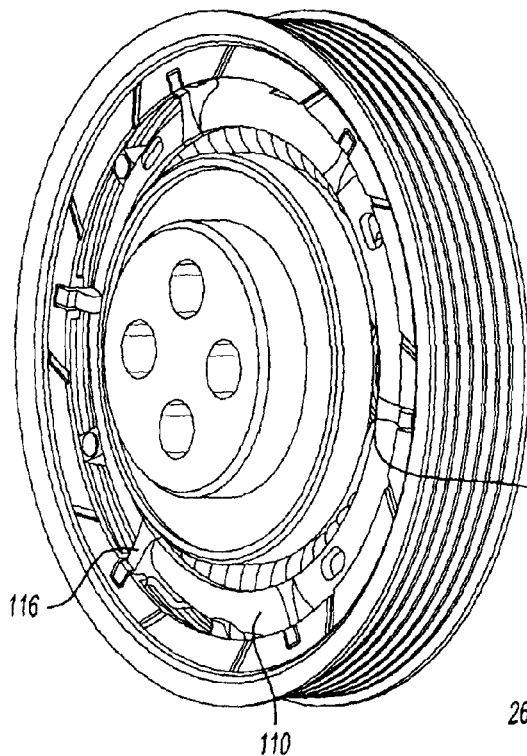
FIG. 7 is a rear perspective view of a portion of the clutched device shown in FIG. 5.

In FIGS. 5 through 7, a second clutched device incorporating a wrap spring clutch constructed in accordance with the teachings of the present disclosure is generally indicated by reference numeral 10a. In the particular example provided, the clutched device 10a is a crankshaft decoupler that can be similar to that which is disclosed in U.S. Pat. No. 7,624,852 (hereinafter "the US '852 patent") and as such, a detailed discussion of many of the components of the clutched device 10a need not be provided herein. In the particular example provided the clutched device 10a is a clutched pulley, the driving member 12a is a hub, the driven member 14a is a sheave, and the driven clutched device 10a further comprises a bearing 16a and a clutch assembly 18a.

The driving member 12a can be configured to be non-rotatably coupled to a shaft (not shown). The bearing 16a can be disposed between the driving member 12a and the driven member 14a such that the two are mounted coaxially about a common rotational axis. The driven member 14a can comprise an output portion 22a that can be configured to transmit a rotary output. While the output portion 22a depicted herein is configured to engage a poly-V belt, it will be appreciated that the output portion 22a could be configured to engage more belts, or could be configured to transmit rotary power through a chain drive or a gear drive (in which case the output portion 22a would include sprocket teeth or gear teeth, respectively).

The clutch assembly 18a can include a clutch input member 26a, a clutch output member 28a, a cover plate 30a, a wrap spring 32a, a carrier assembly 100 and a thrust ring 36a.

The clutch input member 26a can be integrally formed with the driving member 12a and can comprise a pair of radial lugs (not specifically shown). The clutch output member 28a can be integrally formed with the driven member 14a and can include a clutch surface 46a. The cover plate 30a can be fixedly coupled to the driven member 14a and can close an axial end of a chamber defined by the driving member 12a and the driven member 14a into which the remainder of the clutch assembly 18 is received.

Figure 8:
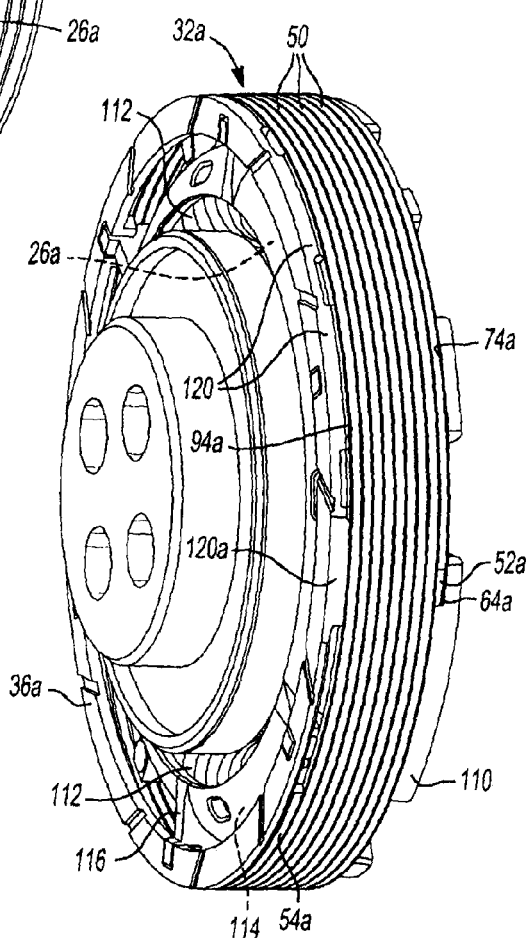
FIG. 8 is a perspective view of a portion of the clutched device of FIG. 5 illustrating portions of a driving member and a clutch assembly.

With reference to FIGS. 5 and 8, the wrap spring 32a can be formed of a suitable wire material and can comprise a plurality of helical coils 50a, a first end 52a and a second end 54a. The helical coils 50a can be received within the clutch input member 26a and frictionally engaged (e.g., via a press fit) to the clutch surface 46a. The first and second ends 52a and 54a can extend from opposite axial ends of the helical coils 50a and will be discussed in more detail below.

The carrier assembly 100 can comprise a carrier shell 110 and a plurality of arcuate coil springs 112. The carrier shell 110 can define arcuate recesses 114, which are configured for receipt of the arcuate coil springs 112, a groove 64a, a helical ramp 74a, and a plurality of spacer lugs 116. Each arcuate coil spring 112 can be received between one of the radial lugs on the driving member 12a and an abutment surface (not specifically shown) defined by the carrier shell 110. The first end 52a of the wrap spring 32a can be received into the groove 64a, a first axial end of the wrap spring 32a can be abutted against the helical ramp 74a, and the helical coils 50a can be disposed about the circumference of the carrier shell 110.

With reference to FIGS. 5 and 8 through 10, the thrust ring 36a can comprise a spacer portion 90a and a spacer mount 92a. The spacer portion 90a can be somewhat smaller in diameter than the clutch surface 46a and can abut the wrap spring 32a on a side opposite the helical ramp 74a on the carrier shell 110. The side of the spacer portion 90a that abuts the wrap spring 32a can include a helical spacer ramp 94a that can match (and thereby directly abut) the wire that forms the wrap spring 32a. In the particular example provided, the helical spacer ramp 94a is formed of a plurality of discrete and circumferentially spaced apart ramp portions 120 so that the helical spacer ramp 94a extends in a circumferentially discontinuous manner. As the second end 54a of the wrap spring 32a is merely a free end of a last one of the helical coils 50a, the spacer mount 92a is configured to engage the spacer lugs on the carrier shell 110 to non-rotatably couple the thrust ring 36a to the carrier shell 110. It will be appreciated that the second end 54a of the wrap spring 32a will move in a circumferential direction relative to the first end 52a of the wrap spring 32a (and thereby relative to the carrier shell 110 and the thrust ring 36a) due to expansion and contraction of the helical coils 50a that occurs during operation of the clutched device 10a. Accordingly, it will be appreciated that the ramp portion 120a adjacent to the axial end of the second end 54a of the wrap spring 32a can be spaced sufficiently far from the axial end so that the axial end does not contact the ramp portion 120a. It will be appreciated that if such contact does occur it may limit radial expansion of the helical coils 50a (to thereby limit gripping contact between the wrap spring 32a and the clutch surface 46a) and/or cause a portion of the helical coils 50a to disengage the clutch surface 46a.

As described in the US '852 patent, rotary power can be transmitted from the driving member 12a through the radial lugs into a torsionally resilient member (e.g., a pair of arcuate helical coil springs 112) and into the carrier shell 110.

As the first end 52a of the wrap spring 32a is engaged to the carrier shell 110, rotational energy is transmitted through the carrier shell 110 and into the wrap spring 32a. Rotary power input to the wrap spring 32a can cause the helical coils 50a to expand somewhat in a radially outwardly direction and further engage the clutch surface 46a to thereby transmit rotary power from the wrap spring 32a to the driven member 14a.

The thrust ring 36a is sized in an axial direction to limit axial expansion of the wrap spring 32a along the rotational axis of the clutched device 10a (i.e., toward the cover plate 30a), as well as to provide damping of the second end 54a of the wrap spring 32a. More specifically, the thrust ring 36a is sized so that the wrap spring 32a will not elongate along the rotational axis to an extent where the clearance between any adjacent pair of the helical coils 50a would be sufficiently large so as to permit buckling and/or bending of any individual one of the helical coils 50.

It will be appreciated that axial elongation of the wrap spring 32a can drive the thrust ring 36a into contact with the cover plate 30a and that such contact can provide normal or axial damping of the wrap spring 32a. Because the end face EF of the thrust ring 36a is flat and because the helical spacer ramp 94a conforms to the axial end of the wrap spring 32a, contact between the thrust ring 36a and the cover plate 30a can be uniform about their circumference, which provides more consistent damping (as compared to a similar device that lacks the thrust ring 36a) and lowers wear and stresses exerted on the cover plate 30a by avoiding point loading that would occur if the cover plate 30a were directly contacted by the wrap spring 32a. It will be further appreciated that sliding engagement of the second end 54a of the wrap spring 32a on the spacer mount 92a and/or against the helical spacer ramp 94a (e.g., in response to changes in the magnitude of the rotary load that is transmitted through the wrap spring 32a) can provide radial damping of the wrap spring 32a.

If desired, the thrust ring 36a can include grooves 130 in the surface that abuts the cover plate 30a. The grooves 130 could be employed for circulating a flow of fluid for cooling or lubricating the clutched device 10a. In the particular example provided, the grooves 130 are oriented to drive a liquid lubricant in the chamber in a radially inward direction to aid in the lubrication of the interfaces between the carrier shell 110 and the arcuate helical coil springs 112. It will be appreciated, however, that the grooves 130 could be employed for transporting a lubricant in a predetermined radial direction as the clutched device 10a rotates in a predetermined rotational direction. In this regard, the grooves 130 need not extend directly radially toward the center of the clutched device 10a but rather could be inclined such that rotation of the pulley with respect to the carrier shell 110 will urge lubricant into and along the grooves 130. The lubricant exiting the grooves 130 will again migrate to the outer periphery of the volume within the clutched device due to centrifugal force to thereby lubricate the arcuate helical coil springs 112 and a surface of the carrier shell 110 against which the arcuate helical coil springs 112 contact.

Figure 11:
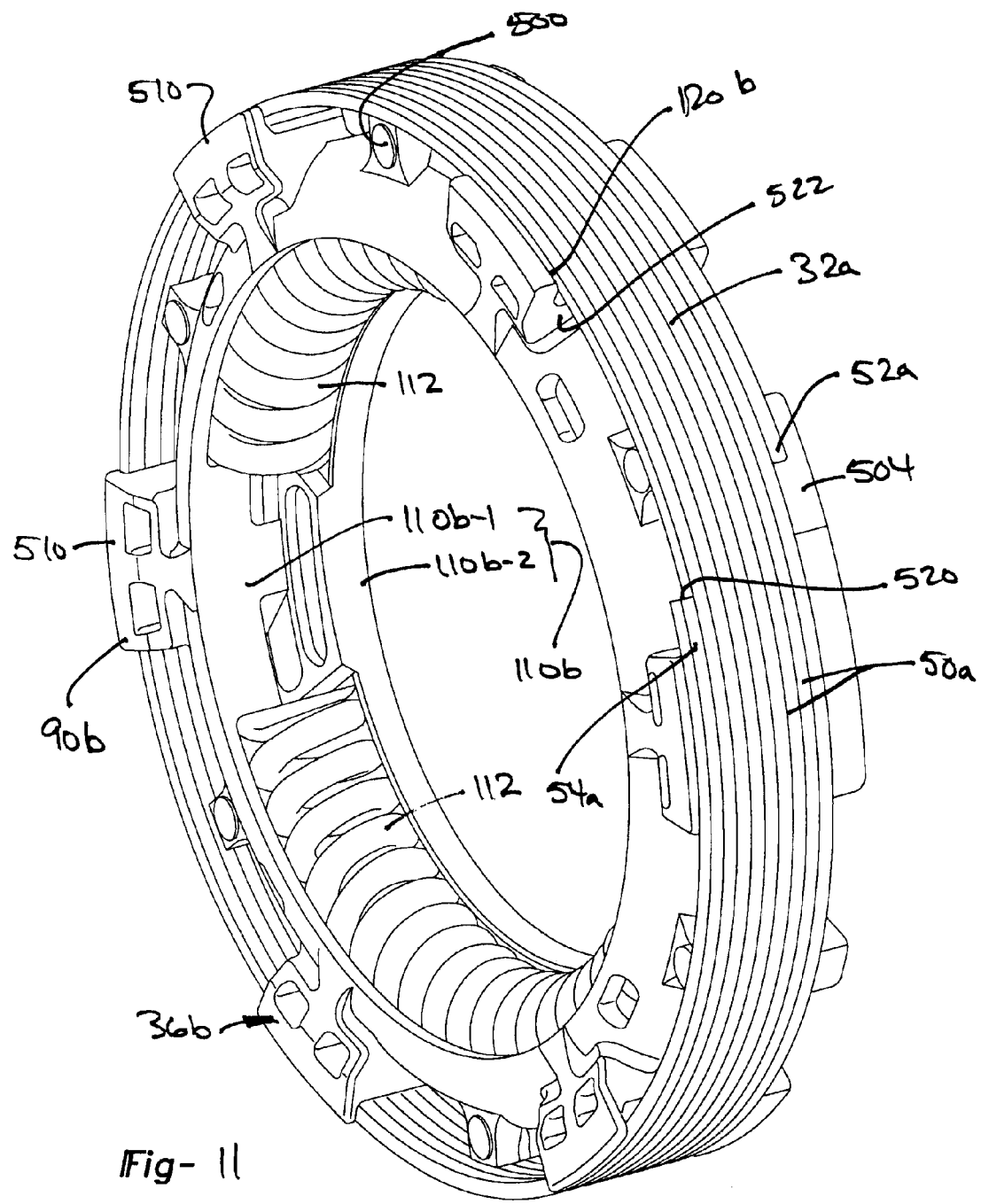
FIG. 11 is a portion of another clutched device constructed in accordance with the teachings of the present disclosure that illustrates a portion of a clutch assembly.
Figure 12:
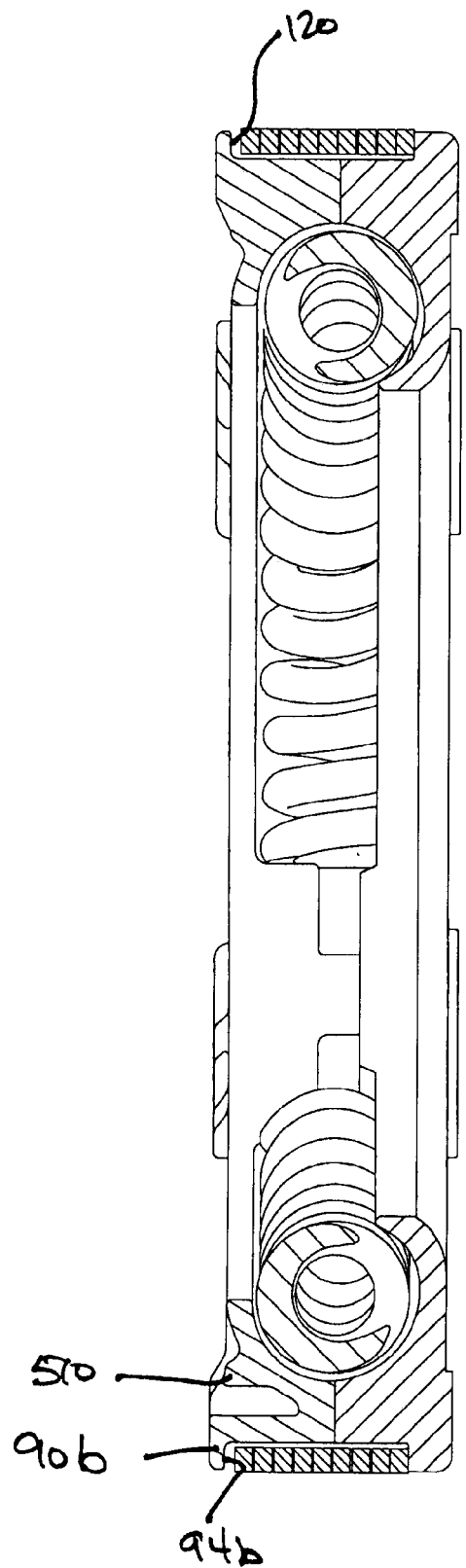
FIG. 12 is a longitudinal section view of the portion of the clutched device shown in FIG. 11.

While the thrust ring 36a has been described and illustrated as being a discrete component that is assembled to the carrier shell 110, it will be appreciated that the invention may be integrated into a clutched device in various different manners. For example, a clutched device having a thrust ring 36b that can be integrally formed with a portion 110b-1 of a carrier shell 110b is partly shown in FIGS. 11 and 12.

Except as otherwise described herein, the clutched device can be generally similar to a crankshaft decoupler that is described in U.S. Pat. No. 7,624,852 (hereinafter "the '852 patent"), the disclosure of which is incorporated by reference as if fully set forth in its entirety herein. Briefly, the clutched device comprises a carrier shell 110b having first and second portions or shells 110b-1 and 110b-2, respectively, that can be coupled to one another via fasteners (e.g., rivets 500) and can cooperate to house a pair of arcuate helical coil springs 112. The second portion 110b-2 of the carrier shell 110b can serve as a mount 504 for the first end 52a of the wrap spring 32a. As the structure and function of the mount for the first end 52a need not differ significantly from that which is disclosed in the '852 patent, further discussion of the second portion 110b-2 need not be provided herein.

The first portion 110b-1 of the carrier shell 110b can enclose the springs 112 on a side opposite the second portion 110b-2. Moreover, the first portion 110b-1 can comprise a spacer portion 90b that can abut the wrap spring 32a. The spacer portion 90b is shown in the particular example provided as comprising a plurality of circumferentially spaced-apart tabs 510 that are integrally formed with a remainder of the first portion 110b-1 of the carrier shell 110b, but it will be appreciated that the spacer portion 90b could be formed as a continuous circumferentially-extending structure that is integrally formed with the remainder of the first portion 110b-1 of the carrier shell 110b. An axial side of the spacer portion 90b can define a helical ramp 94b that can abut the wrap spring 32a. As the second end 54a of the wrap spring 32a is merely a free end of a last one of the helical coils 50a, it will be appreciated that the second end 54a of the wrap spring 32a can move in a circumferential direction relative to the first end 52a of the wrap spring 32a (and the tabs 510) due to expansion and contraction of the helical coils 50a that occurs during operation of the device. It will be appreciated that the ramp portion 120b adjacent to the axial end 520 of the second end 54a of the wrap spring 32a can be spaced sufficiently far from the axial end 520 such that the axial end 520 does not contact the ramp portion 120b during normal operation of the device. A radial end face 522 of the ramp portion 120b could be positioned to contact the axial end 520 of the second end 54a of the wrap spring 32a to limit radial expansion of the helical coils 50a (to thereby limit gripping contact with the wrap spring 32a and a clutch surface (not shown) and/or to cause a portion of the helical coils 50a to disengage the clutch surface.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

| Listing of Elements | |
|---|---|
| clutched device | 10 |
| clutched device | 10a |
| driving member | 12 |
| driving member | 12a |
| driven member | 14 |
| driven member | 14a |
| bearings | 16 |
| bearing | 16a |
| clutch assembly | 18 |
| clutch assembly | 18a |
| output portion | 22 |
| output portion | 22a |
| clutch input member | 26 |
| clutch input member | 26a |
| clutch output member | 28 |
| clutch output member | 28a |
| thrust plate | 30 |
| cover plate | 30a |
| wrap spring | 32 |
| wrap spring | 32a |

-continued

| Listing of Elements | |
|---|---|
| carrier | 34 |
| thrust ring | 36 |
| thrust ring | 36a |
| thrust ring | 36b |
| radial lug | 40 |
| abutment surface | 42 |
| clutch surface | 46 |
| clutch surface | 46a |
| helical coils | 50 |
| helical coils | 50a |
| first end | 52 |
| first end | 52a |
| second end | 54 |
| second end | 54a |
| carrier body | 60 |
| lug recess | 62 |
| groove | 64 |
| groove | 64a |
| first portion | 70 |
| second portion | 72 |
| helical ramp | 74 |
| helical ramp | 74a |
| end face | 80 |
| first spacer portion | 90 |
| spacer portion | 90a |
| spacer portion | 90b |
| second spacer portion | 92 |
| spacer mount | 92a |
| helical spacer ramp | 94 |
| helical spacer ramp | 94a |
| helical ramp | 94b |
| mating groove | 96 |
| carrier assembly | 100 |
| carrier shell | 110 |
| carrier shell | 110b |
| first portion | 110b-1 |
| second portion | 110b-2 |
| springs | 112 |
| arcuate recesses | 114 |
| spacer lugs | 116 |
| ramp portions | 120a |
| ramp portion | 120a |
| ramp portion | 120b |
| grooves | 130 |
| rivets | 500 |
| mount | 504 |
| tabs | 510 |
| axial end | 520 |
| radial end face | 522 |
| corner | C |
| dimension | D1 |
| dimension | D2 |
| end face | EF |
| width | W |

What is claimed:

1. A clutched device comprising:
a driving member;
a driven member; and
a clutch assembly between the driving and driven members, the clutch assembly comprising a carrier, a wrap spring and a spacer, the carrier being configured to couple the wrap spring to one of the driving and the driven member to permit the transmission of rotary power therebetween, the spacer being configured to limit elongation of the wrap spring in an axial direction;
at least one resilient member is disposed between the carrier and the driving member,
wherein the spacer is non-rotatably coupled to a second end of the wrap spring and wherein the spacer is not rotationally coupled to the driving member.

2. The clutched device of claim 1, wherein the wrap spring is formed of wire having a width (W) and wherein the spacer limits elongation of the wrap spring in an axial direction to an amount that is less than the width of the wire.

3. The clutched device of claim 2, wherein the spacer limits axial elongation of the wrap spring to a dimension 0.1 times the width (W) to 0.75 times the width (W).

4. The clutched device of claim 1, wherein a plurality of radially extending grooves are formed about the spacer, the grooves being configured to transport a lubricant in a predetermined radial direction as the clutched device rotates in a predetermined rotational direction.

5. The clutched device of claim 1, wherein the at least one resilient member comprises a plurality of arcuate helical coil springs that are housed in the carrier.

6. The clutched device of claim 1, wherein the driven member comprises a pulley.

7. A clutched device comprising:
a driving member having a shoulder;
a thrust ring coupled to the driving member;
a driven member; and
a clutch assembly between the driving member and the driven member, the clutch assembly comprising a lug, a clutch surface, a carrier, a wrap spring, and a spacer, the lug being coupled to the driving member for rotation therewith, the clutch surface being rotatably coupled to the driven member, the carrier being mounted on a hub and abutting the shoulder, the wrap spring having a first end, a second end, and a plurality of helical coils between the first and second ends, the first end being coupled to the carrier and configured to cooperate with the carrier such that rotary power is output from the driving member and input to the wrap spring through at least one of the carrier and an axial end face of a wire that forms a first portion of the wrap spring, the spacer being disposed axially between the thrust ring and the wrap spring, the spacer being coupled to the second end of the wrap spring for rotation therewith.

8. The clutched device of claim 7, wherein the spacer comprises a first spacer portion and a second spacer portion, the first spacer portion abutting an axial end of the wrap spring, the second spacer portion being received into the wrap spring to support at least one of the helical coils.

9. The clutched device of claim 8, wherein the first spacer portion has a helical abutment surface that directly abuts the wire that forms the wrap spring.

10. The clutched device of claim 8, wherein the spacer defines a groove into which the second end of the wrap spring is received.

11. The clutched device of claim 10, wherein the second end of the wrap spring is hook-shaped.

12. The clutched device of claim 7, wherein the wrap spring is formed of wire having a width and wherein the spacer limits elongation of the wrap spring in an axial direction to an amount that is less than the width of the wire.

13. The clutched device of claim 12, wherein the spacer limits axial elongation of the wrap spring to a dimension 0.1 times the width to 0.75 times the width.

14. A clutched device comprising:
a driving member;
a driven member;
a torsionally resilient member receiving rotary power from the driving member; and
a clutch assembly between the torsionally resilient member and the driven member, the clutch assembly comprising a carrier, a wrap spring, and a spacer, the carrier being configured to couple the wrap spring to the driven member to permit transmission of rotary power from the wrap spring to the driven member, the spacer being coupled to the carrier for rotation therewith and being configured to limit elongation of the wrap spring in an axial direction away from the carrier.

15. The clutched device of claim 14, wherein the spacer is a discrete component that is assembled to the carrier.

16. The clutched device of claim 14, wherein the spacer is integrally formed with at least a portion of the carrier.

17. The clutch device of claim 14, wherein the spacer defines a circumferentially discontinuous helical ramp that abuts the wrap spring.

18. The clutch device of claim 14, wherein a first end of the wrap spring is fixedly coupled to the carrier and wherein no portion of the spacer interferes with circumferential movement of a second, opposite end of the wrap spring during normal operation of the clutch device.

19. The clutch device of claim 14, wherein a first end of the wrap spring is fixedly coupled to the carrier and wherein a portion of the spacer is configured to halt circumferential movement of a second, opposite end of the wrap spring to limit radial expansion of the wrap spring.

* * * * *